United States Patent [19]
Lam

[11] Patent Number: 5,408,294
[45] Date of Patent: Apr. 18, 1995

[54] 3D PHOTOGRAPHIC PRINTER WITH DIRECT KEY-SUBJECT ALIGNMENT

[75] Inventor: Nicholas L. Lam, Chai-Wan, Hong Kong

[73] Assignee: Image Technology International, Inc., Norcross, Ga.

[21] Appl. No.: 69,286

[22] Filed: May 28, 1993

[51] Int. Cl.⁶ .............................................. G03B 27/32
[52] U.S. Cl. ........................................ 355/22; 355/33; 355/40; 355/75; 355/43; 348/87; 348/94; 348/95
[58] Field of Search ........................ 355/22, 33, 40, 43, 355/75; 348/87, 94, 95

[56] References Cited

U.S. PATENT DOCUMENTS 5,028,950  7/1991  Fritsch .................................. 355/22
5,036,356  7/1991  Lo ........................................ 355/77

Primary Examiner—Michael L. Gellner
Assistant Examiner—Daniel P. Malley
Attorney, Agent, or Firm—Deveau, Colton & Marquis

[57] ABSTRACT

A 3D printer and method which uses a beamsplitter or a mirror to form a reflected image which is a mirror image of the actual image exposed on the print material. A CCD detector array is placed on the reflected image plane to monitor the key-subject registration. The beamsplitter or mirror is physically linked to the print material cassette so that the CCD detector array shares the same projected image that is exposed on the print material regardless of the printing position. With such an approach, the CCD detector array can directly detect any off-alignment due to mechanical errors or distortion/aberration by the projection lens.

17 Claims, 12 Drawing Sheets

3D PHOTOGRAPHIC PRINTER WITH DIRECT KEY-SUBJECT ALIGNMENT

BACKGROUND OF THE INVENTION

1. Field of the Invention

The present invention relates generally to a photographic printer for producing three-dimensional (3D) photographs, and more specifically to a 3D printer which projects a set of 2D images onto a lenticular-type print material to form a composite 3D photograph.

2. Prior Art

In lenticular-type three-dimensional (3D) photography, the basic process involves taking a plurality of two-dimensional (2D) views from a number of horizontally-spaced vantage points and compressing these 2D views onto each of the lenticules on a lenticular screen to form a 3D composite image of the scene. It is understood that the above-mentioned lenticular screen typically is a sheet of transparent material with the front side embossed with an array of cylindrical lenses and the back side coated with photosensitive layers or the lenticular screen is attached to a photographic film or paper. Moreover, the 2D views typically are captured by a multi-lens camera and exposed in a number of frames on a photographic film. The basic process of producing a lenticular-type 3D photograph from a set of 2D frames has been discussed in detail in a number of books and patent disclosures. For example, Dudley discussed a printing method in "Applied Optics and Optical Engineering" (R. Kingslake, Ed., 1965) wherein the lenticular screen is transported intermittently so that each of the eight 2D images recorded on film is exposed at different angles. T. Okoshi, in "Three-Dimensional Imaging Techniques" (1978) discussed the use of several projectors to expose a plurality of 2D images onto the photographic emulsion. U.S. Pat. No. 3,482,913 of Glenn discloses a method of using a number of projectors for composing 3D photographs. U.S. Pat. No. 3,895,867 of Lo et al. discloses a technique of recording images on all of the film areas underlying the lenticules with intermittent exposure and shifting of the print material, U.S. Pat. No. 4,120,562 of Lo et al. discloses a scanning means for exposing a number of 2D images at different projection angles, and U.S. Pat. No. 4,101,210 of Lo et al. discloses a method of filling the film area underlying the lenticules by using a plurality of projection lenses.

When composing a 3D photograph, two basic procedures must be carried out to ensure a good result: 1) the selection of a "key-subject" on an image, and 2) the alignment of the key-subject in each view. The selection and alignment of the key-subject have also been discussed in a number of books and patent disclosures. N. A. Valyus, in "Stereoscopy" (Focal Press, 1966), discussed the importance of having proper registration of an image to obtain the 3D effect. In U.S. Pat. No. 3,895,867 of Lo et al a method is disclosed for printing in which each negative is visually examined to select an object which will become the center plane of the 3D picture. The selected object is known as the "key-subject". The key-subject in the photographed scene on each of the 2D views must be accurately registered on the lenticular print material in order to produce an in-focus 3D image, and this is one of the most important steps in producing lenticular-type 3D photographs. Because the relative location of the key-subject on each 2D negative varies with the distance of the key-subject from the camera, this location is likely to vary from one set of negatives to the next, or even from one set of 2-D images on the negative to the next set. Also, the key-subject is not necessarily in the center of the frame. Moreover, because the picture-taking lenses on a multi-lens 3D camera may not be perfectly identical or perfectly aligned on the camera, the relative locations are even more difficult to predict.

Key-subject alignment can be carried out manually by an operator or automatically by a computer or an electronic computing means when the 3-D photographs are cropped. Manual alignment methods have been mentioned in U.S. Pat. No. 4,903,069 of Lam and in U.S. Pat. No. 5,028,950 of Fritsch. In general, manual alignment of key-subject is time-consuming and relies heavily on the operator's skill and performance. In order to have a consistent quality and to increase the printing rate of a printer, it is desirable to implement an automated key-alignment scheme on a 3D printer.

Automated key-subject alignment methods have been mentioned or disclosed in a number of patent disclosures. U.S. Pat. No. 5,028,950 of Fritsch discloses key-subject alignment in a dual-stage 3D printer in which frame-to-frame registration data are produced electronically using a sophisticated image-processing system. In the disclosed dual-stage 3D printer, a first stage includes a CCD video camera with a $480 \times 512$ pixel array to capture the image on the negative and present it to the operator for key-subject designation. Within the same video image, an area of $28 \times 28$ pixels is used by an auto registration computer to conduct a correlation search on an image of $55 \times 95$ pixels (or larger area if necessary) from other frames in order to find the key-subject location. After the key-subject information is evaluated for all of the 2-D frames, the negative is transported to a second stage for printing. At the second (printing) stage the previously evaluated key-subject information is used to make adjustments in an effort to ensure registration. In theory, the relative location of the key-subject in each frame can be accurately computed in the first stage and, therefore, the key-subject can be accurately registered in the printing process (second stage). In practice, because such mechanical movement is not always accurate, errors in the registration of key-subject on the photograph do occur.

In the techniques disclosed in U.S. Pat. No. 5,028,950 of Fritsch discussed above, 2D negatives are exposed through a projection lens to form a 3D photograph, but the key-subject data are collected through a video camera. The video camera does not see the key-subject on the actual image that is exposed on the print material. For this reason, errors in key-subject alignment cannot be totally corrected, regardless of the computing algorithm used to find the relative locations of the key-subject. In particular, the printer disclosed in Fritsch uses two different mechanical stages for negative editing and for printing. The dimensional tolerances of such a complex mechanical design also can contribute to errors in key-subject registration.

Accordingly, it can be seen that a need yet remains for a 3-D photographic printer with key-subject alignment which provides consistent and accurate registration of the key-subject. It is to the provision of such a printer that the present invention is primarily directed.

SUMMARY OF THE INVENTION

Briefly described, in a first preferred form the invention comprises a single stage 3-D printer for printing an image array on a photosensitive surface of a lenticular print film from a set of 2-D frames of negative images, each of the 2-D frames having a selected key-subject. The printer comprises film support means for supporting the lenticular print film at a print film location and illumination means for projecting the negative images along a projection path for each image. A positioning means is provided for positioning first and subsequent 2-D images at a printing position along the projection path for each image. Further, means are provided for capturing the location of the key-subject for each image projected along its projection path for the comparison of the location of the key-subject for the first and subsequent 2-D frames. The means for reflecting can take various forms such as a beamsplitter fixedly positioned along the projection path, or a mirror mounted for movement between a first orientation positioned along the projection paths and a second orientation out of the way.

The present invention allows the capture of the location of the key-subject along the projection paths and records its location relative to the rest of the 2-D frame and stores that location information. The stored key-subject information then is compared with key subject location information for a subsequent 2-D frame and the 2-D frame is then moved slightly relative to the print film until the two key-subject locations are in complete registration. The invention has the notable advantage of effecting this registration directly at the printing position so that no error is introduced by moving the 2-D frame to the printing position. In this regard, the registration is effected in a direct manner, rather than in an indirect or predicted manner according to the known prior art.

In another preferred form, the invention comprises a method for printing an image array on a photo sensitive lenticular print film from a set of 2-D frames of negative images, each of the 2-D frames having a selected key subject. The method is carried out in a single-stage, direct manner and includes the steps of positioning the negative at a first printing position for printing a first 2-D frame and detecting and recording the location of the selected key-subject on the first 2-D frame with the first 2-D frame at the first printing position. After printing at this first position, the negative is moved relative to the print film to a subsequent printing position. The method also includes the steps of detecting the location of the selected key subject on the subsequent 2-D frame with the subsequent 2-D frame at the second printing position and comparing the detected location of the key-subject for the subsequent 2-D frame with the stored location of the key-subject on the first 2-D frame. A small adjustment or movement in the negative relative to the print film is then controlled in response to the comparison of the locations of the key-subject on the 2-D frames to effect close registration of the key-subject.

The method and apparatus according to the invention provide superior results over the known art in that the invention obtains very accurate and precise registration of the key-subject. Also, only minimal human input is required, while at the same time obtaining good registration in every or nearly every instance.

Accordingly, it is an object of the present invention to provide a method and apparatus for printing 3-D photographic film which obtains accurate and precise registration of the key-subject.

It is another object of the present invention to provide a method and apparatus of printing 3-D photographic film which obtains excellent key-subject registration, while requiring only minimal human input.

It is another object of the present invention to provide a method and apparatus for printing 3-D photographic film which ensures good registration of key-subject with confidence.

It is another object of the present invention to provide a method and apparatus for printing 3-D photographic film which is simple and durable in operation.

These and other objects, features, and advantages of the present invention will become apparent upon reading the following specification in conjunction with the accompanying drawing figures.

BRIEF DESCRIPTION OF THE DRAWINGS

FIGS. 3–5 are schematic illustrations of a portion of the 3D printer of FIG. 1, wherein:

FIG. 3 shows the positions of the negative carrier, the projection lens and the print material in relation to the lamphouse when the printer is in a position for exposing the first 2D negative;

FIG. 4 shows the positions of the negative carrier, the projection lens, and the print material in relation to the lamphouse when the printer is in a position for exposing the second 2D negative; and FIG. 5 shows the positions of the negative carrier, the projection lens, and the print material in relation to the lamphouse when the printer is in a position for exposing the third 2D negative.

FIG. 6 also shows the image formed by the beamsplitter.

DETAILED DESCRIPTION

Figure 1:
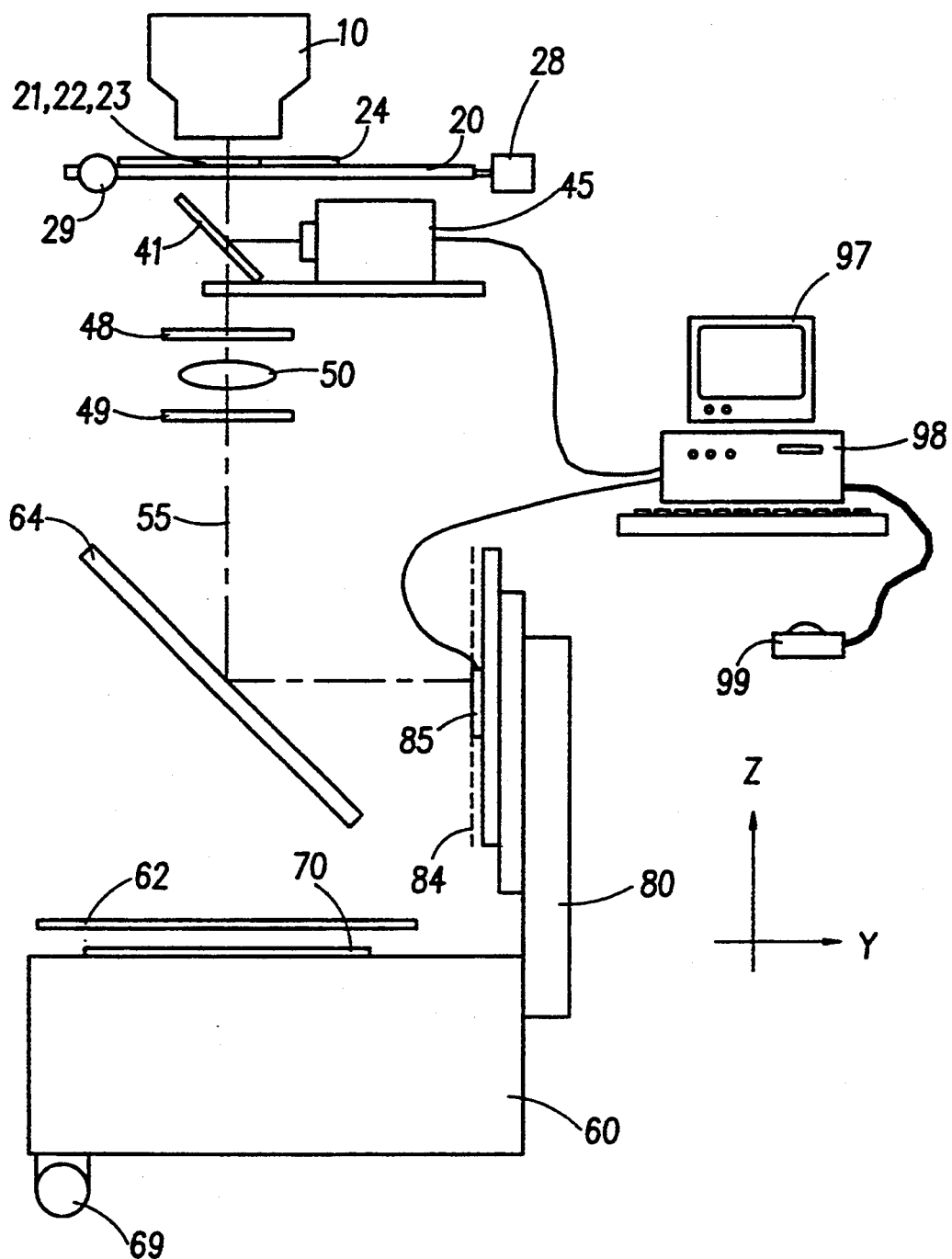
FIG. 1 is a schematic illustration of a preferred embodiment 3D printer according to a preferred form of the present invention.

Referring now in detail to the drawing figures, wherein like reference numerals represent like parts throughout the several views, FIG. 1 schematically depicts a preferred embodiment of the 3D printer according to the present invention. In FIG. 1, numeral 10 denotes a lamphouse, numeral 20 denotes a movable negative carrier on which a negative mount 24 is used to engage a set of 2D negatives in a proper position during a printing cycle. The negative mount has three openings 21, 22, and 23, matching the three 2D frames of a negative set for composing a 3D photograph. The negative carrier is driven by two stepping motors 28 and 29 so its position can be adjusted in the Y and X directions. It should be understood that other types of positioning means can be used for moving and positioning the first and subsequent 2D frames at a printing position at the printing station in lieu of the moveable negative carrier 20.

Numeral 45 denotes a video camera which views the first 2D negative through a plane, first-surface mirror 41 at the beginning of a printing cycle and presents a full frame view on a monitor 97. This first 2D image allows the human operator to select the key-subject and to determine how the picture is to be cropped. This image also is digitized and channeled to the computer 98 for color/density analysis. After the picture is cropped, the video camera and the mirror move out of the way so that they do not obstruct the view of projection lens 50 for the rest of the printing cycle.

Numerals 48 and 49 denote, respectively, an adjustable aperture and a shutter. Shutter 49 is the primary shutter which controls the exposure time. In this preferred embodiment, the projection lens 50 is mounted in a fixed position on the printer. Numeral 60 denotes the print material cassette on which a section of print material 70 is exposed for printing. The print material is shielded by a secondary shutter 62 against light except at the times for exposure. The surface of the print material 70 also is the image plane of the projection lens 50. The print material cassette 60 is driven by a stepping motor 69 along the X direction to different exposure positions. Movement means other than stepping motor 69 can be used for moving the print material cassette 60.

Numeral 64 denotes a beamsplitter positioned along a projection or illumination path 55, which beamsplitter splits a light beam into a transmitted portion and a reflected portion, forming an image on the print material 70 and a mirror image on image plane 84. Numeral 80 denotes a two-dimensional translation stage on which a CCD detector array 85 is mounted. The translation stage 80 is driven by two stepping motors so that the CCD array can move around and reach a large part of the image on the reflected image plane 84. The CCD array, together with the beamsplitter 64, is used to capture the image area of the key-subject and surrounding area on each 2D frame and channel the image data, via a frame grabber, to the computer 98 for key-subject alignment computation.

Numeral 99 denotes a trackball which is used by the operator to select key-subject and to crop a picture (using video camera 45). In FIG. 1, the XY plane of the printer is parallel to the print material 70 and the Y direction is parallel to the lenticules on the print material. In order to eliminate any errors in key-subject registration due to the image displacement by the beamsplitter due to refraction, the beamsplitter 64 should be very thin.

Figure 2:
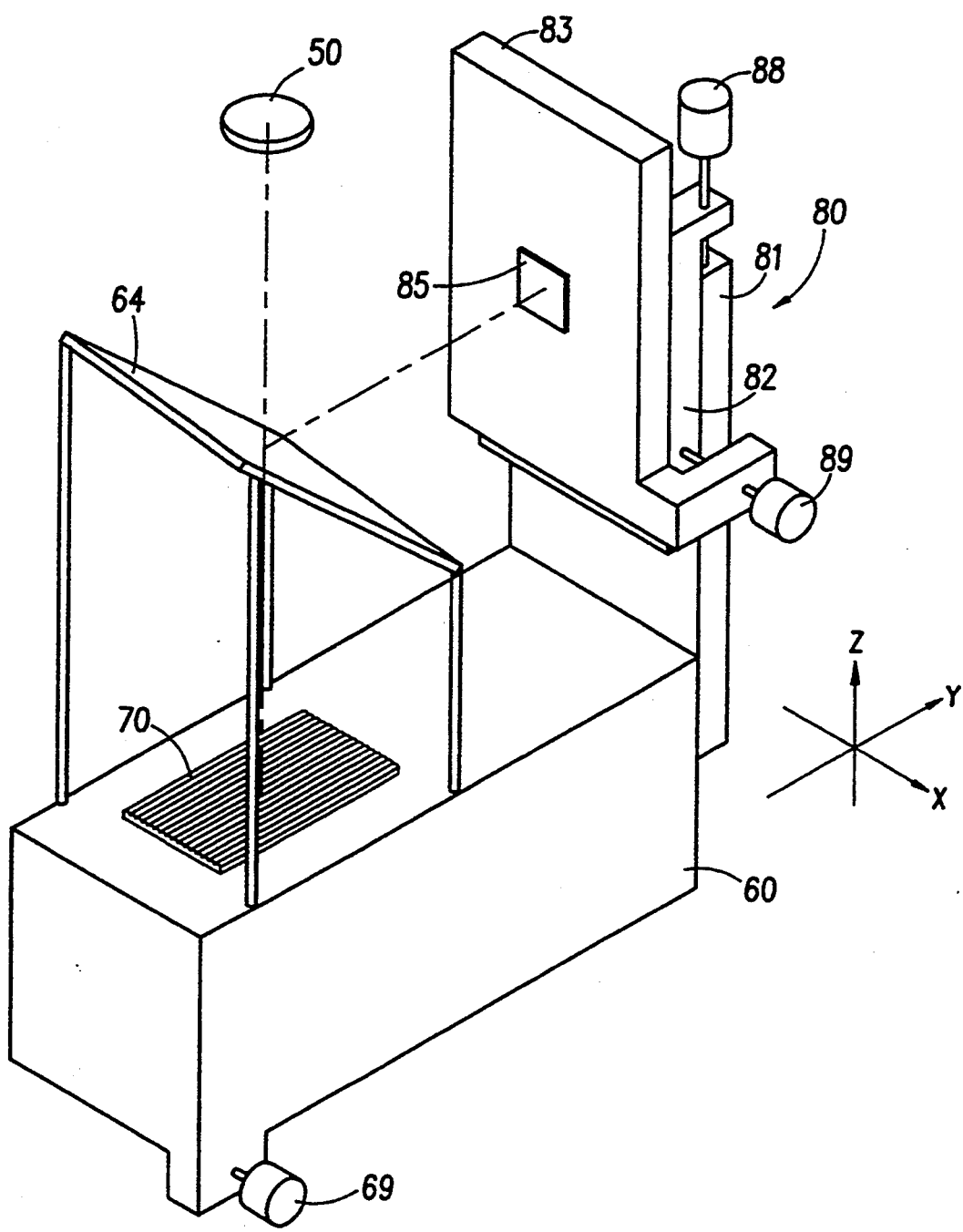
FIG. 2 is a schematic perspective illustration of a portion of the 3D printer of FIG. 1, showing a print material cassette on which a beamsplitter and a CCD array are mounted.

FIG. 2 is a schematic illustration of the print material cassette 60 with more details. As shown, the beamsplitter 64 is mounted on the cassette at a fixed position. The CCD array 85 is mounted on a two-dimensional translation stage 80 which includes an upright base 81 fixedly mounted to the cassette 60. CCD array is one type of image capturing means for capturing the reflected images from the beam splitter 64. A first movable element 82 is movably mounted to upright base 81 and a second movable element 83 is movably mounted to the first movable element 82. Numerals 88 and 89 denote two stepper motors that drive the movable elements 82, 83 of the translation stage 80 in the X and Z directions, respectively. A translation stage 80 with time moveable element 82 and a second moveable element 83 together with the two stepper motors 88 and 89 constitute the moveable mounting means for moving the capturing means to the location of the key subject on the reflected image so as to allow the image capturing means to capture the key subject on first and subsequent 2D frames.

Printing a 3D photograph from a set of 2D negatives involves many steps. All these steps are collectively referred to as a printing cycle. In particular, when a 3D photograph is composed from a set of three 2D negatives, the printing cycle involves the exposure of three 2D negatives at three different projection angles relative to the print material, as shown in FIGS. 3 to 5.

Figure 3:
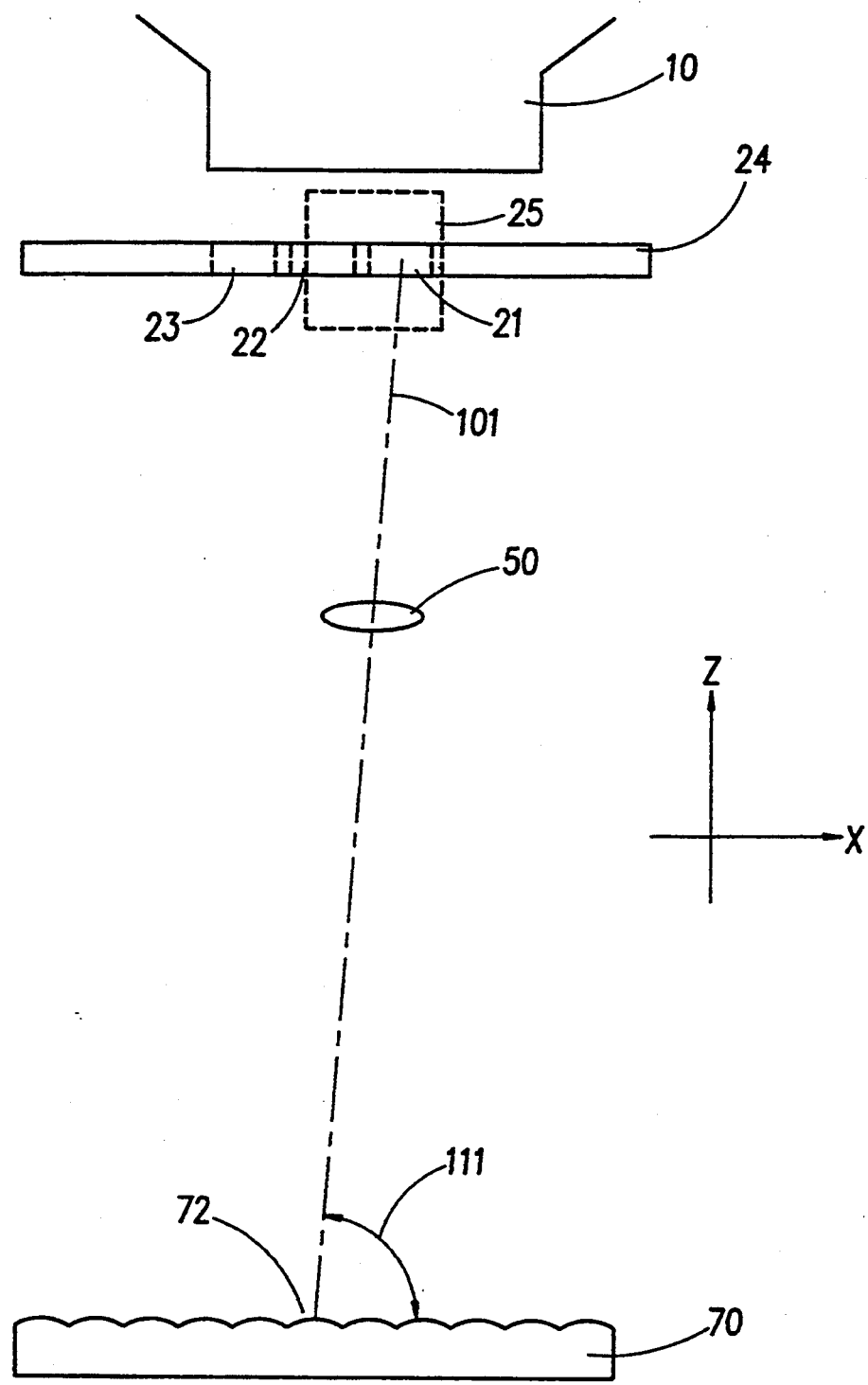

FIG. 3 shows the positions of the negative mount 24, the projection lens 50, and the print material 70 in relation to the lamphouse 10 when the printer is in the position for editing and exposing the first 2D frame of the negative set. The negative is engaged on the negative mount 24 such that the first, second, and third 2D frames of a negative set line up with openings 21, 22 and 23 on the mount. In this first position, the first 2D frame lined up with opening 21 is adjacent the printing position In FIG. 3, dotted line 101 represents the projection path incident upon print material 70 at a projection angle 111, at which angle the first 2D negative is exposed to the print material 70. The center of print material is denoted by numeral 72.

Figure 4:
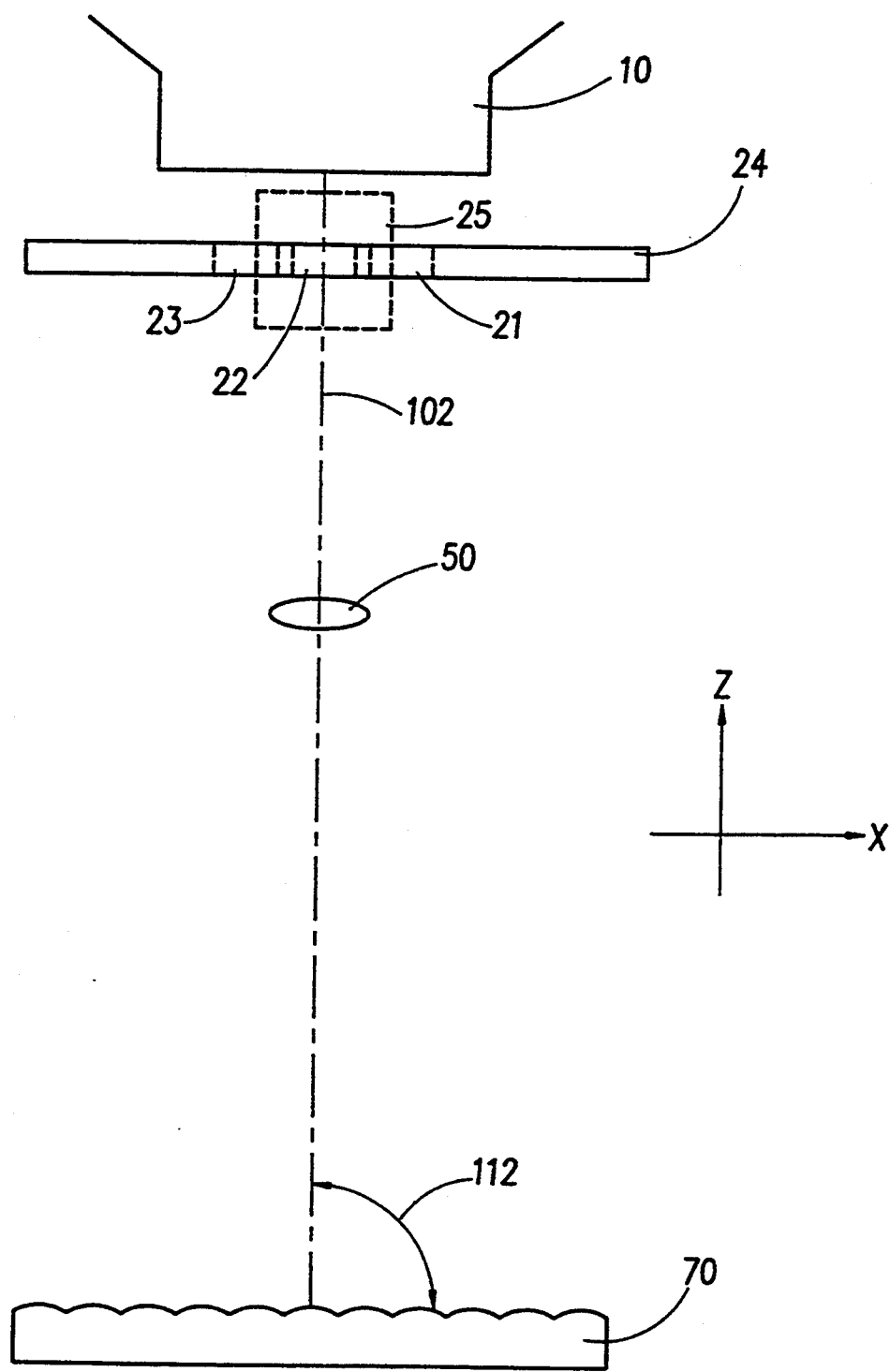

FIG. 4 shows the positions of negative mount 24, the projection lens 50, and the print material 70 in relation to the lamphouse 10 when the printer is in the position for exposing the second 2D negative. In this second position, the second 2D frame lined up with opening 22 is adjacent the printing position 25. In FIG. 4, dotted line 102 represents the projection path incident upon print material 70 at a projection angle 112, at which angle the second 2D negative is exposed to the print material 70.

Figure 5:
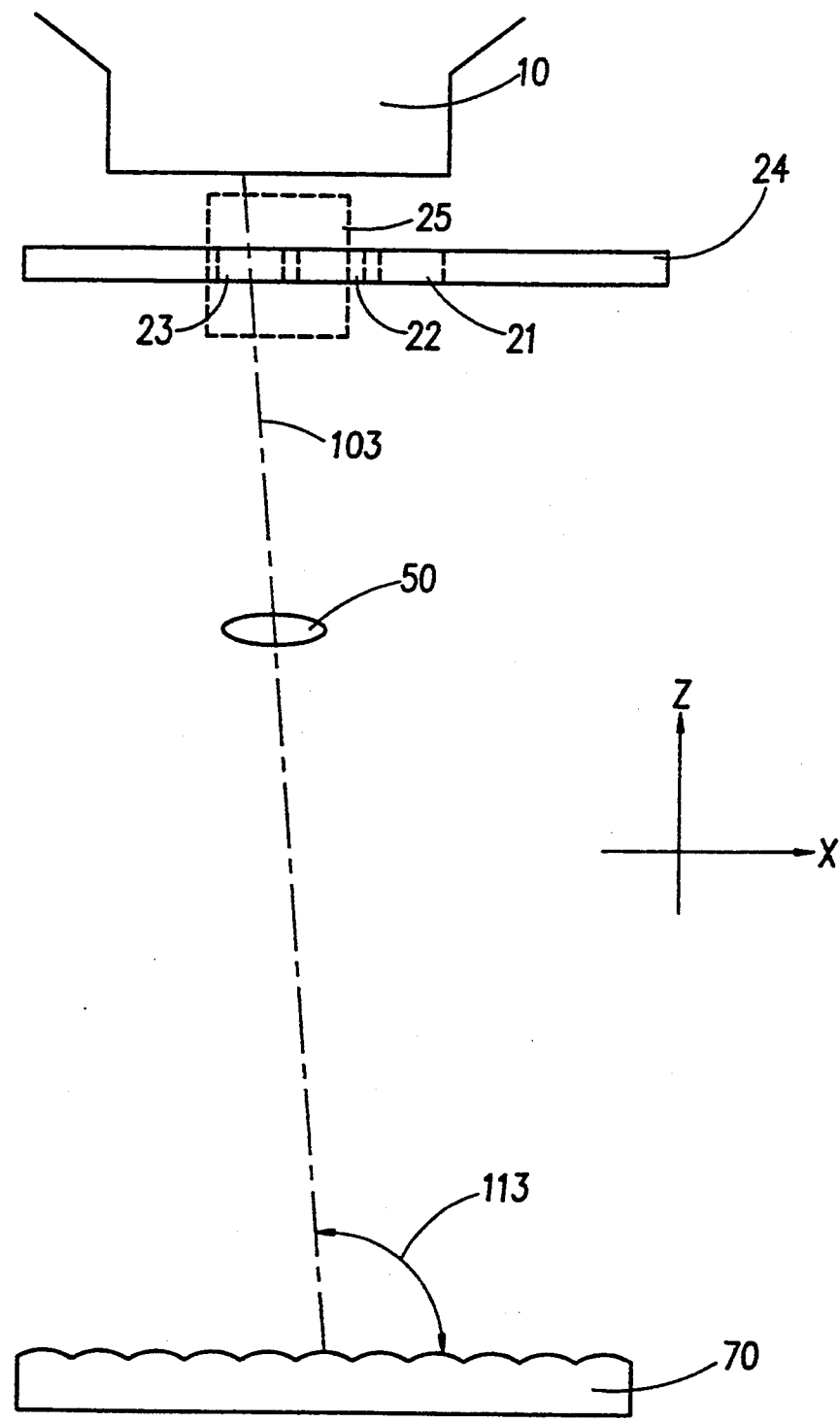

FIG. 5 shows the positions of negative mount 24, the projection lens 50, and the print material cassette 70 in relation to the lamphouse 10 when the printer is in the position for exposing the third 2D negative. In this third position, the third 2D frame lined up with opening 23 is adjacent the printing position 25. In FIG. 5, dotted line 103 represents the projection path incident upon print material 70 at a projection angle 113, at which angle the third 2D negative is exposed to the print material 70.

Figure 6:
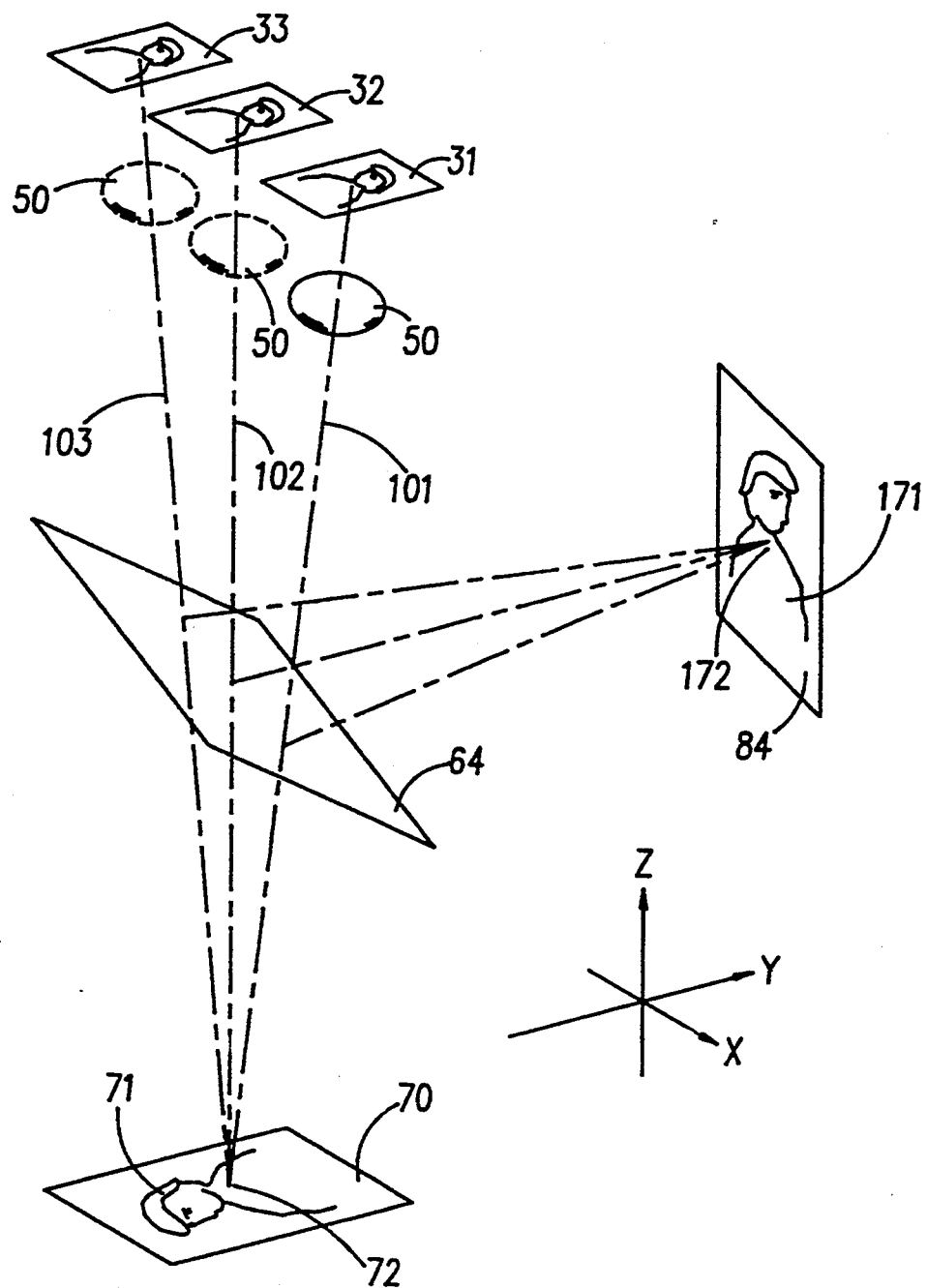
FIG. 6 is a schematic illustration of a portion of the 3D printer of FIG. 1 and shows the positions of the 2D negatives and the projection lens in relation to the print material when the printer is in three different exposure positions.

FIG. 6 shows the positions of three 2D frames and the projection lens in relation to the print material cassette when the printer is in different exposure positions. The positions of the 2D frames are denoted by numerals 31, 32, and 33 and the corresponding projection paths are denoted by numerals 101, 102, and 103. Because the beamsplitter 64 is mounted on the print material cassette, its position, in relation to the print material, is always the same. The image formed on the print material 70 is denoted by numeral 71, while the image formed on the reflected image plane 84 is denoted by numeral 171. Image 171 is formed by part of the projected image 71 that is reflected by the beamsplitter 64. The centers of images 71 and 171 are denoted by numerals 72 and 172. The reflected image 171 is a mirror image of the transmitted image 71. These two images are identical except that one is the reverse of the other, regardless of the projection angles.

Figure 7:
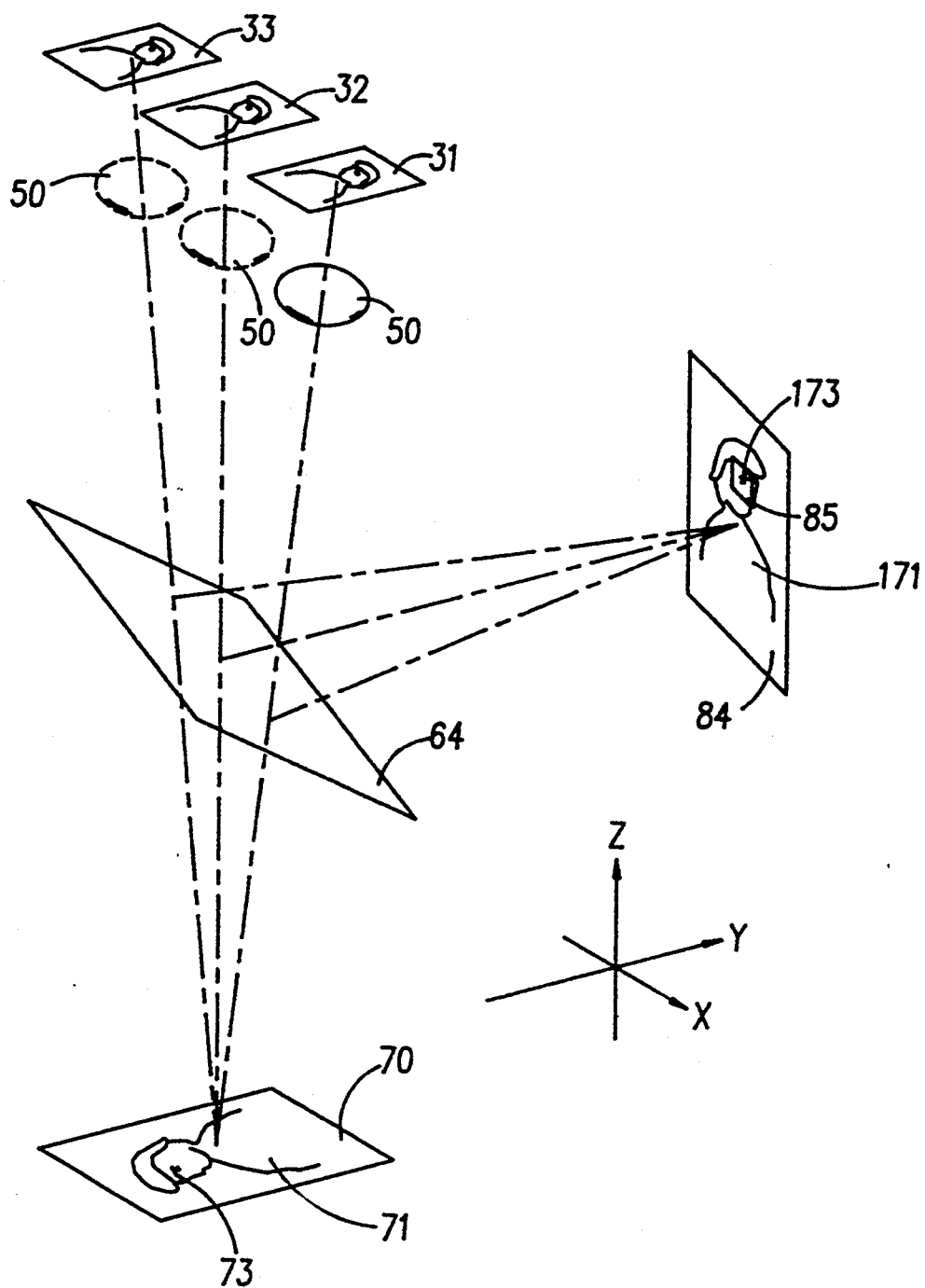
FIG. 7 is a schematic illustration of a portion of the 3D printer of FIG. 1 and shows a CCD detector array used to detect the off-alignment of key-subject between the projected images of different 2D frames.

FIG. 7 shows the relation between the key-subject 73 on image 71 formed on the print material 70 and the key-subject 173 on image 171 formed on the reflected image plane 84 shown in FIG. 1. The CCD detector array 85 is positioned at a fixed location around the key-subject 173 at different exposure positions. Because image 171 is a mirror image of the image 71, any off-alignment on the key-subject 73 at different exposure positions is detected by the CCD array 85. The image data acquired by the CCD array is channeled to the computer 98 which, in turn, adjusts the negative carrier 20 so that the off-alignment is corrected accordingly. Thus, when the CCD detector array 85 does not see any off-alignment, key-subject registration on the 3D photograph is satisfactory. Again, the beamsplitter 64 used to form the mirror image should be very thin so that the refraction occurring when light is transmitted through the beamsplitter does not cause noticeable errors in key-subject registration.

It should be noted that, when a beamsplitter is used to reflect part of the projected image onto the CCD detector array, the transmitted image is slightly displaced by the beamsplitter. This displacement is caused by the refraction by the beamsplitter as light traverses from one medium to another. In order to avoid any noticeable errors in key-subject registration due to image displacement, a very thin beamsplitter should be used, such as a pellicle beamsplitter. Alternatively, an optical path compensator can be provided along with a regular beamsplitter so that displacements on the transmitted image and on the reflected image are equal.

Figure 8:
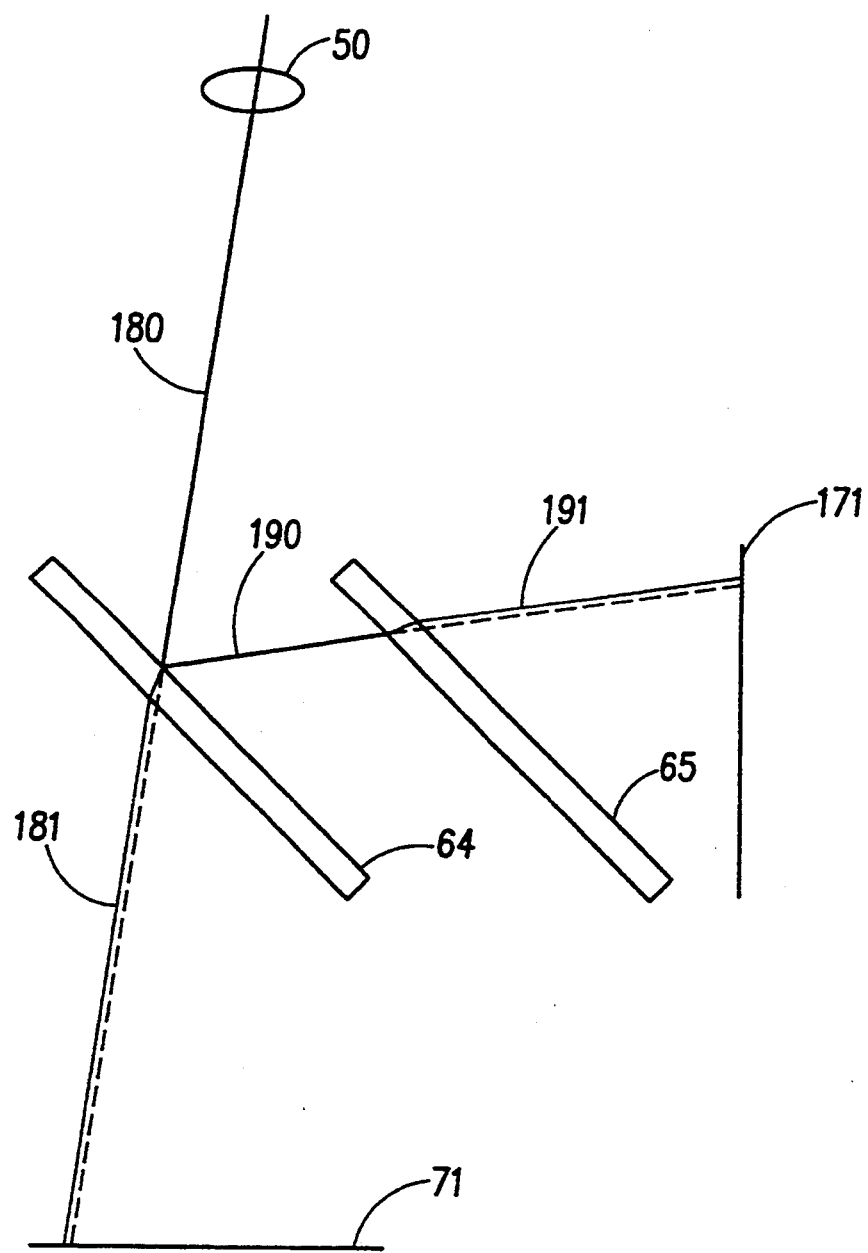
FIG. 8 is a schematic illustration of a portion of the 3D printer of FIG. 1 in a first modified form wherein an optical compensator is used to compensate the key-subject off-alignment due to refraction by the beamsplitter.

FIG. 8 shows an arrangement for eliminating the errors in key-subject registration due to refraction by the beamsplitter 64. As shown in FIG. 8, an optical path compensator 65 can be used along with beamsplitter 64 so that the displacement amount in the reflected image 171 is equal to that in the transmitted image 71. An optical path compensator 65 is an optical substrate which is identical (e.g., has an equal thickness and index of refraction) to the beamsplitter except that the compensation 65 is not coated for reflection. In FIG. 8, numeral 180 denotes a projection path of a light ray from the projection lens 50. Part of the light intensity is reflected to become light ray 190. After light ray 180 traverses the beamsplitter 64, it is displaced slightly and the displaced ray is denoted by numeral 181. Similarly, after light ray 190 traverses the compensator 65, it is displaced slightly and the displaced ray is denoted by numeral 191. If the thickness and the refractive index of the compensator are identical to those of the beamsplitter, then the displacement amounts will be the same. The dotted lines show the undisplaced paths.

Figure 9:
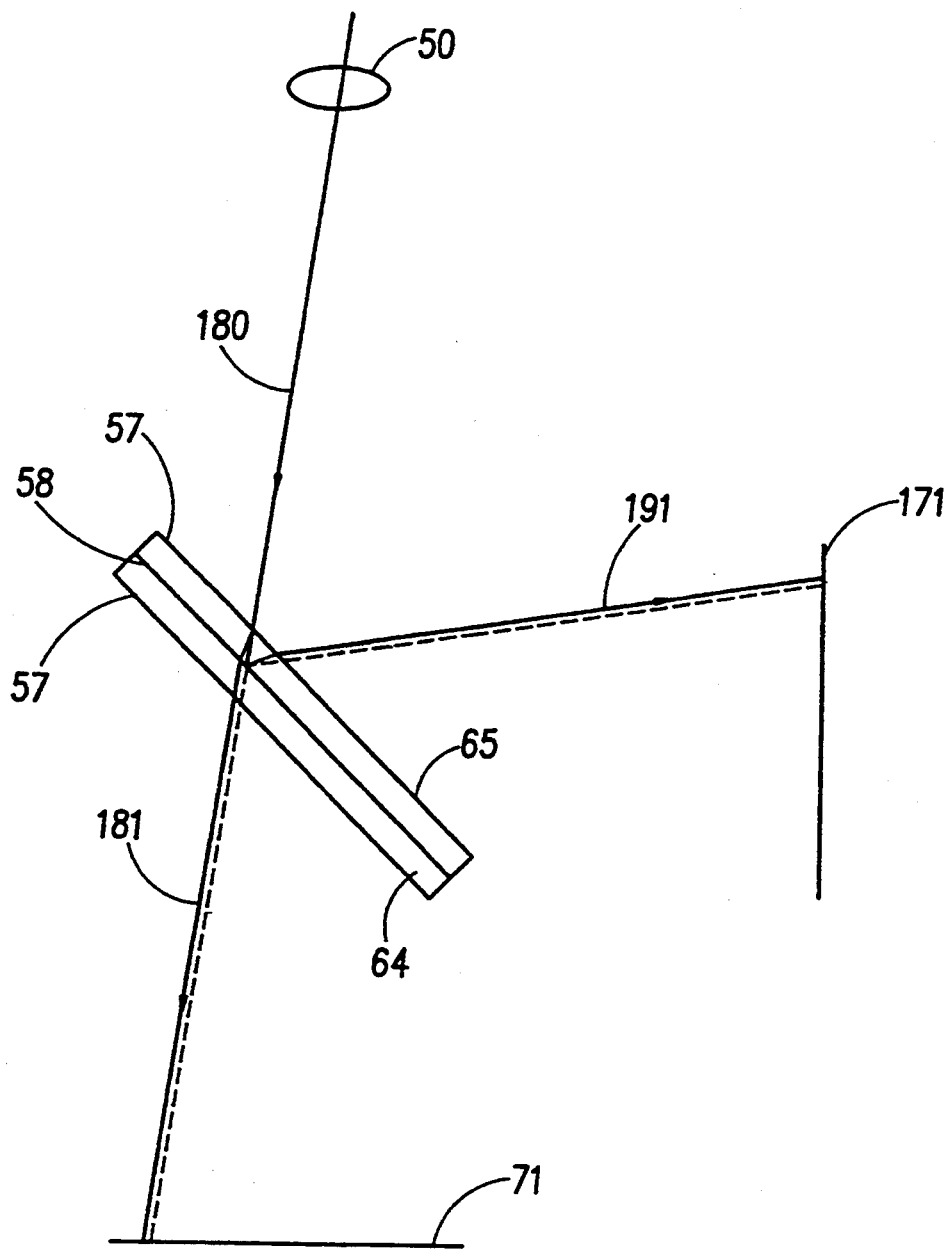
FIG. 9 is a schematic illustration of a portion of the 3D printer of FIG. 1 in a second modified form wherein an optical compensator is used to compensate the key-subject off-alignment due to refraction by the beamsplitter.

FIG. 9 shows another arrangement for eliminating the errors in key-subject registration due to the refraction by the beamsplitter 64. As shown in FIG. 9, an optical path compensator 65 is placed on top of a beamsplitter 64 so that the displacement amount in the reflected image 171 is equal to that in the transmitted image 71. The optical path compensator 65 is an optical substrate which is identical to the beamsplitter except that substrate is not coated for reflection. In order to eliminate unnecessary reflections, the beamsplitter and the optical compensator are coated with anti-reflection coating at proper surfaces as denoted by numeral 57. The reflecting surface of the beamsplitter is denoted by numeral 58. In FIG. 9, numeral 180 denotes a light ray from the projection lens 50. After light ray 180 traverses the beamsplitter 64 and the optical compensator 65, the reflected ray and the transmitted ray are displaced slightly as denoted by numeral 191 and numeral 181, respectively. If the thickness and the refractive index of the compensator are identical to those of the beamsplitter, then the displacement amounts will be the same. The dotted lines show the undisplaced paths.

Figure 10:
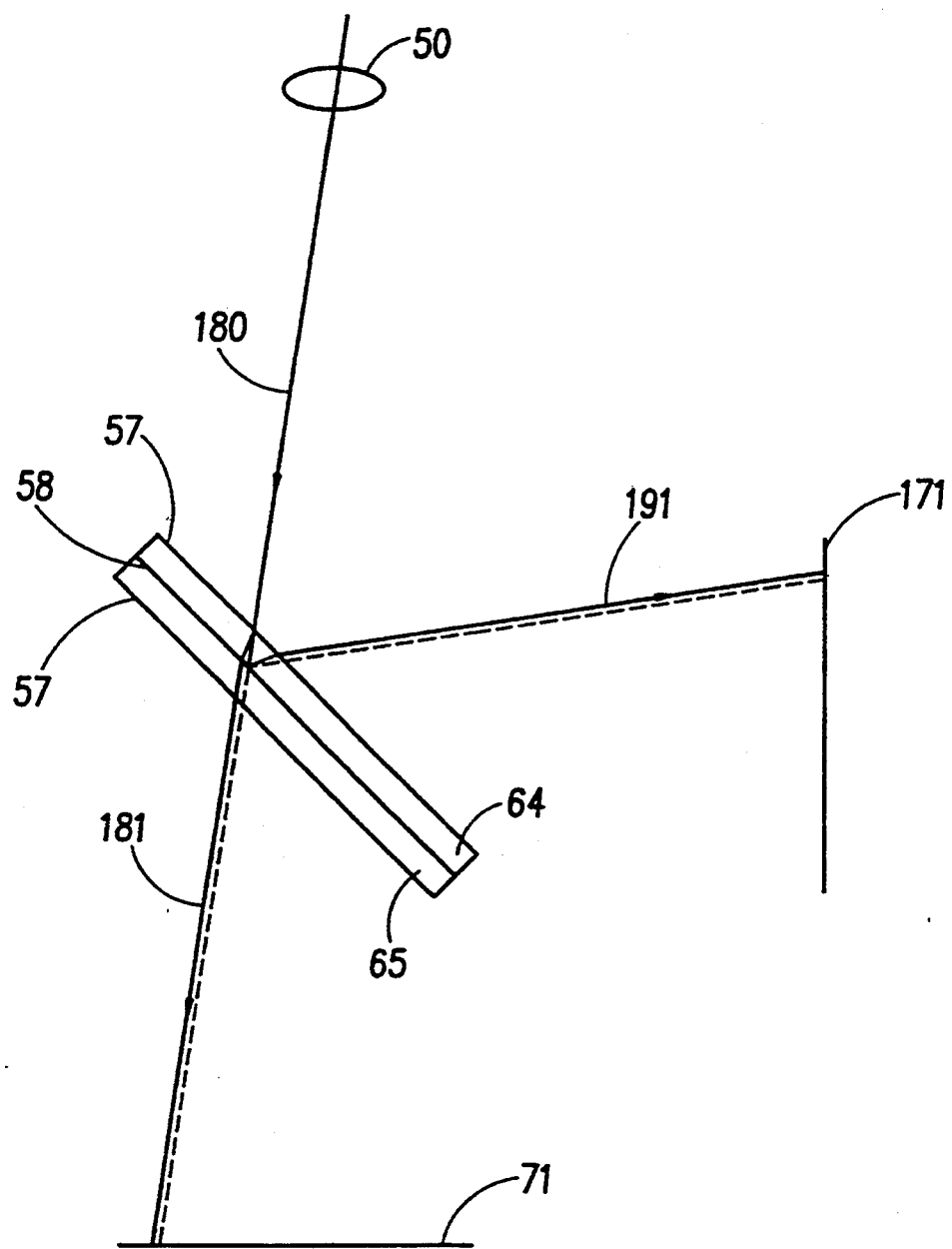
FIG. 10 is a schematic illustration of a portion of the 3D printer of FIG. 1 in a third modified form wherein an optical compensator is used to compensate the key-subject off-alignment due to refraction by the beamsplitter.

FIG. 10 shows yet another arrangement for eliminating the errors in key-subject registration due to the refraction by the beamsplitter 64. As shown in FIG. 10, an optical path compensator 65 is placed underneath beamsplitter 64 so that the displacement amount in the reflected image 171 is equal to that in the transmitted image 71. The optical path compensator 65 is an optical substrate which is identical to the beamsplitter except that substrate is not coated for reflection. In order to eliminate unnecessary reflections, the beamsplitter and the optical compensator are coated with antireflection coating at proper surfaces as denoted by numeral 57. The reflecting surface of the beamsplitter is denoted by numeral 58. In FIG. 10, numeral 180 denotes a light ray from the projection lens 50. After light ray 180 traverses the beamsplitter 64 and the optical compensator 65, the reflected ray and the transmitted ray are displaced slightly as denoted by numeral 191 and numeral 181, respectively. If the thickness and the refractive index of the compensator are identical to those of the beamsplitter, then the displacement amounts will be the same. The dotted lines show the undisplaced paths.

Figure 11:
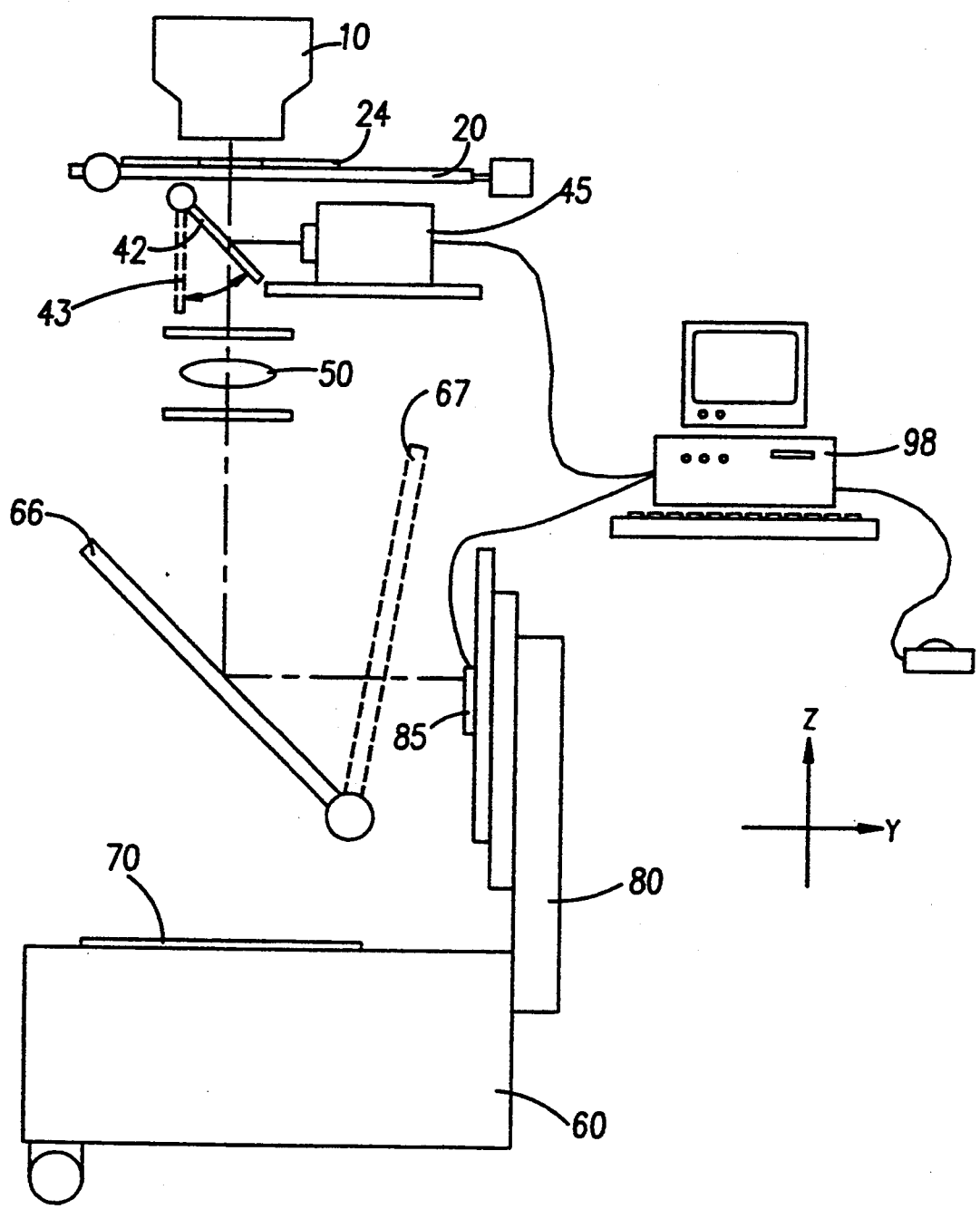
FIG. 11 is a schematic illustration of a 3D printer in another preferred form wherein a flip mirror is used to substitute for the beamsplitter and another flip mirror substitutes for a fixed mirror.

As shown in FIG. 11A, a plane mirror 66 can be used to substitute for both the beamsplitter 64 and the secondary shutter 62 shown in FIG. 1. The plane mirror 66 and beam splitter 64 are both reflection means located along the projection path for reflecting each projected image to form a reflected image on a reflected image plane. For example, a plane, first-surface or front-coated mirror 66 is used in place of the beamsplitter to form an image on the reflected image plane 84 so that the CCD array 85 can monitor the off-alignment of the key-subject. But when it is time for exposure, mirror 66 flips to another position denoted by numeral 67 so that the projected image is formed on the print material 70. Likewise, a flipping mirror 42 can be used to substitute for the fixed mirror 41 shown in FIG. 1 so that the video camera 45 can take a full view of the first 2D frame. After the picture is cropped and key-subject selected, mirror 42 flips to another position 43 so that it does not obstruct the view by the projection lens 50.

Figure 12:
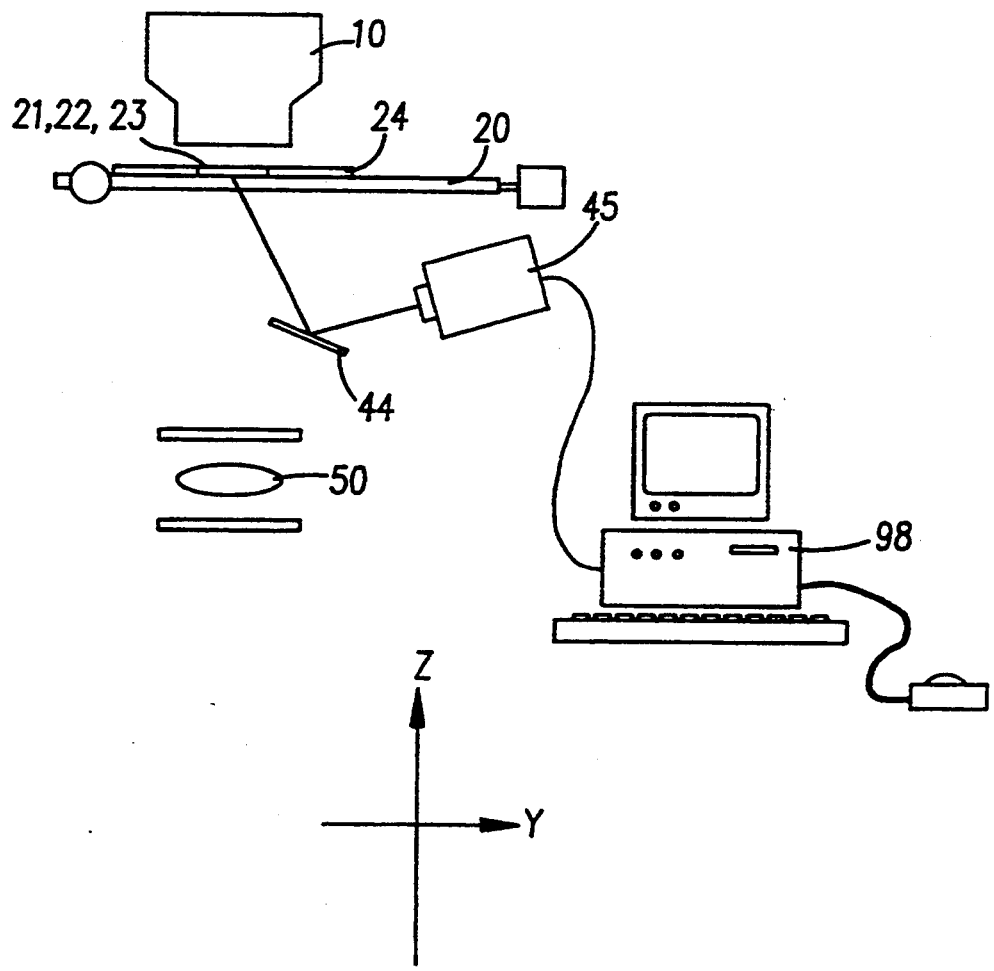
FIG. 12 is a schematic illustration of a 3D printer in yet another preferred form wherein a video camera views the first 2D negative through a plane, first-surface mirror from an oblique angle.

FIG. 12 shows another arrangement for setting up the video camera 45. As shown, the video camera views the first 2D frame via a plane, first-surface mirror 44 at an oblique angle.

In composing a 3D photograph, it is required that different 2D views are projected at different angles. Consequently, the relative positions of the 2D negatives, the projection lens, and the print material must be mechanically shifted to different locations. Notwithstanding, the reflected image is always a mirror image of the image projected on the print material, because the CCD array and the beamsplitter are physically linked to the print material cassette at fixed locations throughout different printing positions. Thus, the CCD array sees exactly how the key-subject is registered when different 2D negatives are projected on the print material, regardless of the projection angles. Using an image comparison algorithm, a computer corrects any errors in key-subject registration sensed by the CCD detector array.

In the first embodiment disclosed herein, the printer uses a beamsplitter to provide the CCD array a mirror image of the image projected on the print material. With such an approach, the CCD array is always in registration with the print material, regardless of the printing position. At the beginning of a printing cycle, a video camera takes a full image of the first 2D frame for key-subject selection and other purposes such as picture cropping and color analysis. After the key-subject is selected, the CCD array moves to the key-subject location and remains stationary for the rest of the printing cycle. Through the beamsplitter, the CCD array shares the key-subject image with the print material. The key-subject image of each 2D frame is captured and channeled to the computer for key-subject alignment. Using an image comparison algorithm, the computer quantifies the errors in key-subject registration between 2D frames and then corrects the errors by adjusting the positions of the 2D negatives. This key-subject alignment process can be repeated until a satisfactory registration is achieved.

OPERATION

In use, the invention is operated as follows. Negatives are placed in the negative mount 24 (see FIG. 1) for initial editing and cropping using video camera 45. Also, video camera 45, computer 98, and monitor 97 are used to identify (select) the key-subject in the first 2D frame. Once the key-subject is identified, its location can be ascertained using the beamsplitter 64 and the CCD array 85. This location information then is stored in the computer 98 for later comparison. The first 2D frame is then ready for printing, as shown in FIG. 3. The computer 98 and monitor 97 constitute the electronic comparison and control means for storing and comparing said key subjects which is done while the 2D image to be primed is positioned at the printing station.

After printing the first 2D frame, the negative carrier 20 is moved by the stepping motor 29 to bring the second 2D frame to the printing station 25 for printing, as shown in FIG. 4. The print material cassette 60 is driven by stepping motor 69 prior to printing (or prior to obtaining registration) to change the projection angle. Compare FIGS. 3 and 4. However, prior to printing the second 2D frame, the location of the key-subject of the second frame is captured using beamsplitter 64 and CCD array 85 and then is compared with the stored information about the location of the key-subject in the first 2D frame. Based on the comparison, the computer 98 controls operation of the stepping motors 28 and 29 to adjust the position of the second 2D frame to obtain good and precise registration of the key-subject between the first and second 2D frames. Once registration is obtained, the second 2D frame is then ready for print. The second 2D frame then is exposed (printed) on the lenticular print film material 70. Registration and printing of the third 2D frame is carried out substantially as for the second 2D frame.

In the preferred embodiments of the 3D printer according to the present invention disclosed herein, the projection lens is mounted in a fixed position in the printer while the negative carrier and the print material cassette move to different positions for the exposure of a number of 2D negatives at different projection angles. However, because the positions of the projection lens, the negative carrier, and the print material cassette are all relative, any two of the three components can be chosen to move within a printing cycle.

CCD array 85 is disclosed as being of limited size and mounted for movement via translation stage 80 in order to effectively cover the entire projected image while at the same time minimizing the total number of computations needed to compare the locations of the key-subject for the 2D frames. Alternatively, the CCD array can be made much larger, doing away with the need for the translation stage 80. Such a large CCD array could also be used for cropping of the image and selection of the key-subject, eliminating the need for video camera 45. In vitalizing such a large CCD array, computations can be kept to a minimum by only comparing information within a given smaller area positioned about the key-subject. In other words, the entire array would be used for editing, cropping, and key-subject selection, and only a portion of the array would be used for key-subjection location comparisons.

The principle of 3D printing concerning the printer according to the present invention has been described in reference to the composing of a 3D photograph from a set of three 2D views. The same principle is, in general, applicable to the composing of a 3D photograph from a set of 2D views with only two frames or more than three frames.

While the present invention has been disclosed in preferred forms, it will be obvious to those skilled in the art that many modifications, additions, and deletions can be made therein without departing from the spirit and scope of the invention as set forth in the appended claims.

What is claimed is:

1. A single stage 3D printer for printing 3D photographs on lenticular print material from a plurality of 2D image frames each of which having a selected key subject said printer comprising:
   (a) a printing station having means for supporting the lenticular print material during printing;
   (b) a projection lens for projecting each of said 2D images along a projection path onto said prim material positioned in the printing station of said printer;
   (c) positioning means for positioning the first and subsequent 2D frames at a printing position at the printing station;
   (d) movement means for moving said print material to different positions in relation to said print position for exposing each 2D image at a different projection angle;

(e) reflection means located along said projection path for reflecting each projected image to form a reflected image on a reflected image plane;

(f) image capturing means located on said reflected image plane for capturing said reflected images;

(g) movable mounting means for moving said capturing means to the location of the key subject on said reflected image so as to allow said image capturing means to capture the key subject image on the first and subsequent 2D frames; and (h) electronic comparison means and control means for storing and comparing said key subject images while the 2D image to be printed is positioned at said printing station so that the comparison and printing can be done at said printing station; wherein, elements (a)–(h) are located in a single stage of said 3D printer.

2. A 3D printer of claim 1, wherein said reflection means comprises a beamsplitter.

3. A 3D primer of claim 2, wherein said reflection means further comprises an optical path compensator for equalizing displacement of light path caused by said beamsplitter.

4. A 3D printer of claim 1, wherein said reflection means comprises a mirror mounted for movement between a first configuration for reflecting said projected images and a second configuration for clearing said projection paths thereby allowing projected images to expose on said print material unobscured.

5. A 3D printer of claim 1, wherein said electronic control means controls movement of said positioning means relative to said print material to effect registration of key subject on the reflected images while one of said 2D frames is at said priming position.

6. A 3D printer of claim 1, wherein said image capturing means comprises a CCD array sensor.

7. A single stage 3D printer for printing 3D photographs on lenticular print material from a plurality of 2D image frames recorded on film, each of said 2D image frames having a selected key subject, said printer comprising:

(a) movable support means for supporting said film for movement to the printing position for printing the first 2D image frame and subsequent 2D frames;

(b) detection means for detecting and storing the image of a selected key subject on the first 2D frame while said first 2D frame is at said printing position, and for detecting and storing the image of said selected key subject on the subsequent 2D frame while said subsequent 2D frame is at said printing position; and (c) comparison and control means for comparing the detected image of key subject of one 2D frame with the stored image of key subject on another 2D frame while the 2D image to be printed is positioned at said printing position so that the comparison and printing can be done at said printing position; wherein elements (a)–(c) are located in a single stage of said 3D printer.

8. A 3D printer of claim 7, wherein said comparison and control means compares the detected key subject image on each subsequent 2D frame with the stored key subject image of the first 2D frame.

9. A 3D printer of claim 7, wherein said comparison and control means compares the detected key subject image on each subsequent 2D frame with the stored key subject image of the preceding 2D frame.

10. A 3D printer of claim 7, wherein said detection means comprises reflection means.

11. A 3D printer of claim 10 further comprising projector means for projecting the image of each 2D frame along a projection path toward said print material and wherein said reflection means is positioned along said projection path for reflecting said projection image to form a reflected image on a reflected image plane.

12. A 3D printer of claim 11, wherein said detection means further comprises an image capturing means located on said reflected image plane for capturing said reflected images.

13. A 3D printer of claim 12, wherein said image capturing means is mounted for movement.

14. A 3D printer of claim 10, wherein said reflection means comprises a beamsplitter, and an optical path compensator for equalizing displacement of light path caused by said beamsplitter.

15. A 3D printer of claim 10, wherein said reflection means comprises a mirror mounted for movement between a first configuration for reflecting said projected images and a second configuration for clearing said projection paths thereby allowing projected images to expose on said print material unobscured.

16. A method of printing a 3D photograph on a lenticular print material from a set of 2D image frames each of which having a selected key subject, said method comprising the steps of:

(a) positioning the first 2D frame at a printing position for printing a first 2D image;

(b) detecting and storing the key subject image of the first 2D frame while the first frame is at said printing position while the 2D image to be printed is positioned at said printing position;

(c) positioning a subsequent 2D frame at said printing position, and detecting and comparing the key subject image of the subsequent 2D frame with the stored key subject of a preceding 2D frame while at said printing position;

(d) adjusting said printing position for effecting registration of the key subject image of said subsequent 2D frame and the key subject image of said preceding 2D frame;

(e) printing the subsequent 2D image while at said printing position;

(f) detecting and storing the key subject image of the subsequent 2D frame while said subsequent 2D image is at said printing position; and (g) repeating steps (c)–(d) until all 2D image frames are printed; wherein steps (a)–(g) are conducted in a single stage printer.

17. A method of claim 16, wherein the preceding 2D frame in step (c) is the first 2D frame.

* * * * *